United States Patent
Stevens et al.

(10) Patent No.: US 7,424,985 B2
(45) Date of Patent: Sep. 16, 2008

(54) HELICAL PRETENSIONER

(75) Inventors: Bruce A. Stevens, Oakland, MI (US); Chris A. Adamini, Shelby Township, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 399 days.

(21) Appl. No.: 11/039,526

(22) Filed: Jan. 19, 2005

(65) Prior Publication Data

US 2005/0156075 A1 Jul. 21, 2005

Related U.S. Application Data

(60) Provisional application No. 60/537,783, filed on Jan. 20, 2004.

(51) Int. Cl.
*B60R 22/46* (2006.01)
(52) U.S. Cl. ................. 242/374; 280/806; 280/807; 297/475; 297/480; 242/370
(58) Field of Classification Search ........... 242/374, 242/370; 280/806, 807; 297/475, 480
See application file for complete search history.

(56) References Cited

U.S. PATENT DOCUMENTS

| | | | |
|---|---|---|---|
| 3,109,615 A * | 11/1963 | Fritz | 244/138 R |
| 3,219,288 A * | 11/1965 | Fritz | 242/370 |
| 4,422,366 A | 12/1983 | Weyer | |
| 4,597,546 A | 7/1986 | Yamamoto et al. | |
| 4,745,847 A | 5/1988 | Voss | |
| 5,035,757 A | 7/1991 | Poole | |
| 5,460,668 A | 10/1995 | Lyon | |
| 5,553,803 A | 9/1996 | Mitzkus et al. | |

(Continued)

OTHER PUBLICATIONS

Office Action U.S. Appl. No. 11/054,793, filed Feb. 9, 2005 dated for Jul. 9, 2007.

(Continued)

*Primary Examiner*—Peter M. Cuomo
*Assistant Examiner*—Stefan Kruer
(74) *Attorney, Agent, or Firm*—L. C. Begin & Associates, PLLC.

(57) ABSTRACT

A seatbelt pretensioner mechanism (10) for use with a seatbelt retractor (11). The retractor (11) has a spool (16) configured for winding a seatbelt webbing thereon. The pretensioner mechanism (10) is housed inside the retractor spool (16). The pretensioner mechanism (10) includes a movable actuator member (22) slidably coupled to the retractor spool (16), and a stationary member (20) secured to the retractor (11) along a path of slidable movement of the movable member (22). Helical splines (23) extend along a portion of the spool (16), and complementary helical splines (25) extend along a first portion of the movable member (22) for slidingly engaging the splines (23) on the spool (16). Helical splines (29) also extend along a second portion of the movable member (22), and complementary helical splines (28) extend along a portion of the stationary member (20) for slidingly engaging the splines (29) on the second portion of the movable member (22). Activation of the pretensioner mechanism (10) produces a sliding movement of the movable member (22), thereby producing simultaneous sliding engagement between the complementary groups of helical splines. Simultaneous sliding engagement between the complementary groups of helical splines produces a rotation of the spool (16) with respect to the stationary member (20), thereby pretensioning a seatbelt webbing wound on the spool (16).

20 Claims, 3 Drawing Sheets

U.S. PATENT DOCUMENTS

| | | | |
|---|---|---|---|
| 5,667,161 A | 9/1997 | Mitzkus et al. | |
| 5,743,480 A | 4/1998 | Kopetzky et al. | |
| 5,756,929 A | 5/1998 | Lundstrom et al. | |
| 5,782,423 A * | 7/1998 | Miller et al. | 242/374 |
| 5,806,888 A | 9/1998 | Adamini | |
| 5,839,686 A | 11/1998 | Dybro et al. | 242/374 |
| 5,872,329 A | 2/1999 | Burns et al. | |
| 5,924,640 A * | 7/1999 | Hickey | 242/374 |
| 5,984,223 A | 11/1999 | Hiramtsu | 242/379.1 |
| 6,009,809 A | 1/2000 | Whang | |
| 6,105,893 A | 8/2000 | Schmidt et al. | 242/374 |
| 6,341,799 B1 | 1/2002 | Furusawa et al. | |
| 6,349,628 B1 | 2/2002 | Heineken | |
| 6,419,177 B2 | 7/2002 | Stevens | |
| 6,505,790 B2 | 1/2003 | Stevens | |
| 6,568,621 B2 * | 5/2003 | Hiramatsu et al. | 242/379.1 |
| 6,752,421 B2 | 6/2004 | Khandhadia et al. | |
| 2005/0173581 A1 | 8/2005 | Stevens | |

OTHER PUBLICATIONS

Office Action U.S. Appl. No. 11/054,793, filed Feb. 9, 2005 dated for Dec. 28, 2007.

* cited by examiner

HELICAL PRETENSIONER

CROSS REFERENCE TO RELATED APPLICATIONS

This application claims the benefit of provisional application Ser. No. 60/537,783, filed on Jan. 20, 2004.

BACKGROUND OF THE INVENTION

The present invention relates to seatbelt systems and, more particularly, to a pretensioner for a seatbelt system.

Seatbelt pretensioners remove slack from a safety belt in the event of a collision in order to minimize forward movement of the passenger. Many existing pretensioner designs are used in conjunction with a conventional seatbelt retractor, and utilize a clutch assembly for coupling the pretensioner to the retractor in the event of a collision, to enable pretensioning of the seatbelt. However, such clutch assemblies add to the expense and complexity of the seatbelt system. Clutch assemblies also add to the space occupied by the seatbelt system.

The present invention provides advantages over known pretensioner designs, which typically utilize a pretensioning mechanism situated outside of the retractor frame. By locating the pretensioning mechanism inside the retractor spool, the size of the pretensioner/retractor assembly can be reduced compared to known designs. In addition, in the design disclosed herein, a clutch assembly is not required to couple the pretensioner and the retractor spool.

SUMMARY OF THE INVENTION

The present invention provides a seat belt pretensioner mechanism for use with a seatbelt retractor. The retractor has a spool configured for winding a seatbelt webbing thereon. The pretensioner mechanism is housed inside the retractor spool.

The pretensioner mechanism includes a movable actuator member slidably coupled to the retractor spool, and a stationary member secured to the retractor along a path of slidable movement of the movable member. A first plurality and a second plurality of engageable motion transmission elements are provided for operatively interengaging the spool, the movable member, and the stationary member. First ones of the first plurality of motion transmission elements extend along a portion of the spool, and second ones of the first plurality of motion transmission elements extend along a first portion of the movable member. The second ones of the first plurality of motion transmission elements are configured for operative engagement with the first ones of the first plurality of motion transmission elements.

First ones of the second plurality of motion transmission elements extending along a second portion of the movable member, and second ones of the second plurality of motion transmission elements extending along a portion of the stationary member. The second ones of the second plurality of motion transmission elements are configured for sliding engagement with the first ones of the second plurality of motion transmission elements.

At least one plurality of the first and second pluralities of motion transmission elements has a helical configuration for producing relative rotation between first ones and second ones of the at least one plurality of motion transmission elements upon sliding engagement therebetween. Activation of the pretensioner produces a sliding movement of the movable member, thereby producing simultaneous sliding engagement between the first ones and the second ones of the first plurality of motion transmission elements and sliding engagement between the first ones and the second ones of the second plurality of motion transmission elements. Simultaneous sliding engagement of the first plurality of motion transmission elements and sliding engagement of the second plurality of motion transmission elements produce a rotation of the spool with respect to the stationary member, thereby pretensioning a seatbelt webbing wound on the spool.

The present invention provides advantages over known pretensioner designs, which typically utilize a pretensioning mechanism situated outside of the retractor frame. By locating the pretensioning mechanism inside the retractor spool, the size of the pretensioner/retractor assembly can be reduced compared to known designs. In addition, in the design disclosed herein, a clutch assembly is not required to couple the pretensioner and the retractor spool.

DETAILED DESCRIPTION

Figure 1:
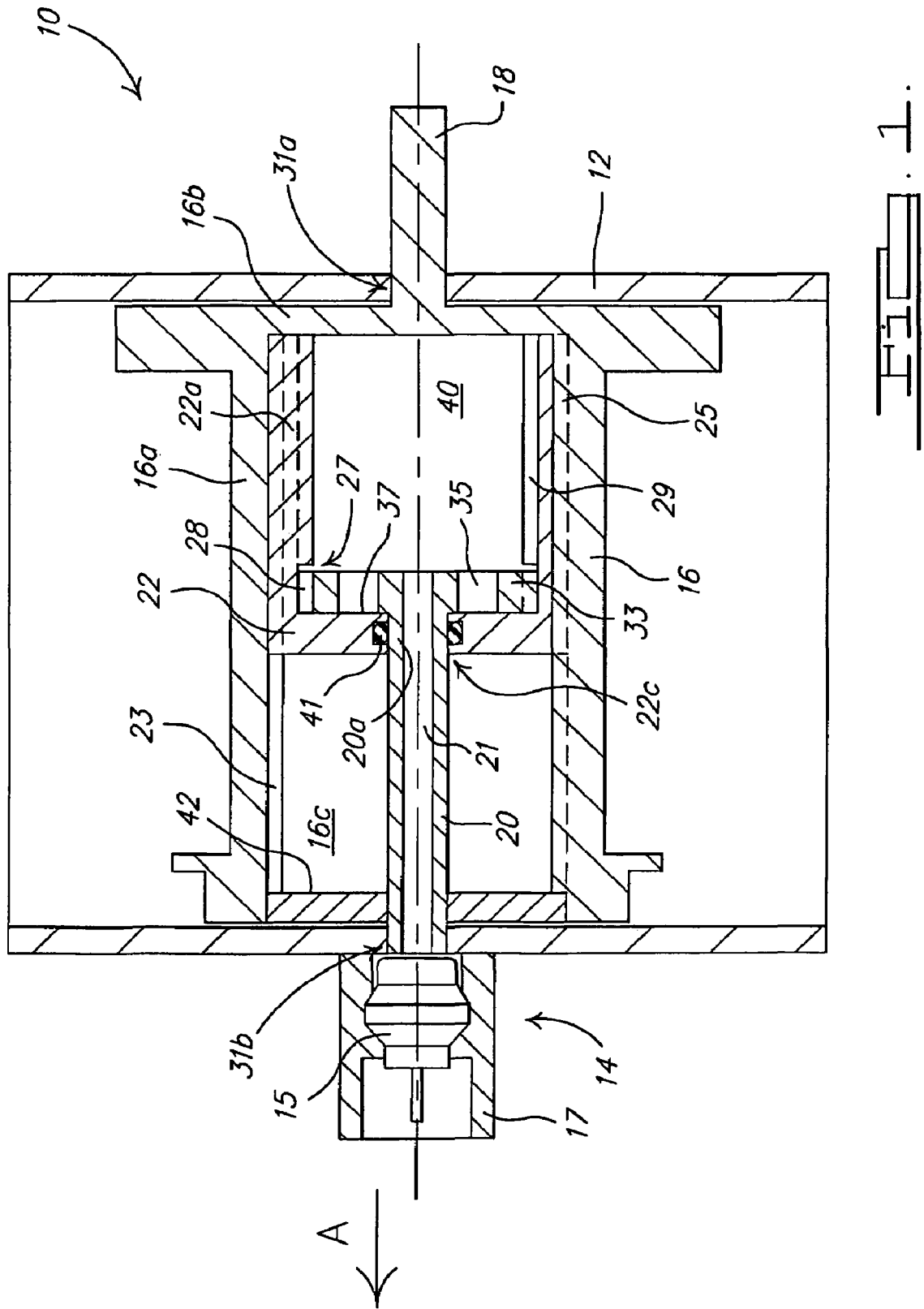
FIG. 1 is a cross-sectional side view of a first embodiment of a pretensioner mechanism in accordance with the present invention.

Referring to FIG. 1, there is illustrated a pretensioner mechanism 10 in accordance with a first embodiment of the present invention. Pretensioner mechanism 10 is designed for use with (or incorporation into) a conventional seatbelt retractor 11 having a retractor frame 12, adapted to mount in a vehicle, and a rotatable spool 16, around which conventional seatbelt webbing (not shown) may be wrapped. All the component parts of retractor 10 are manufactured from known materials and by known processes.

Pretensioner mechanism 10 includes a movable actuator member 22 slidably coupled to spool 16, and a stationary member 20 secured to retractor 11 along a path of slidable movement of actuator 22 (In a direction indicated by arrow "A").

Spool 16 has an end of the seatbelt secured thereto and preferably rotates freely relative to retractor frame 12 at two bearing points 31a and 31b, allowing the seatbelt to be alternately wrapped and unwrapped as needed. In the first embodiment, bearing point 31a comprises a cylindrical extension 18 on spool 16 that rotates in retractor frame 12, whereas bearing point 31b preferably comprises a portion of spool 16 that rotates about a stationary member 20, which is fixed relative to retractor frame 12. Spool 16 has a substantially cylindrical sidewall 16a and an endwall 16b. Sidewall 16a and endwall 16b defined an interior cavity 16c of the spool.

Referring again to FIG. 1, in the first embodiment, actuator 22 includes a wall 22a defining an interior cavity 40. Actuator 22 further includes an aperture 22c formed therein to enable communication between actuator cavity 22b and an exterior of the actuator. Actuator 22 also includes one or more pressure surfaces 37 along a side of the actuator residing within interior cavity 22b. Actuator 22 is slidably received within spool interior cavity 16c and is preferably substantially cylindrical and substantially coaxial with spool 16. Actuator 22 may be formed from steel, aluminum, metal alloys, plastic, and/or other known materials. A substantially fluid-tight sealed journal (for example, utilizing an O-ring) is formed at aperture 22c to permit rotation of actuator 22 about a shaft portion 20a of stationary member 20 and to prevent fluid leakage at the interface between shaft portion 20a and actuator 22.

Referring again to FIG. 1, in the first embodiment of the pretensioner mechanism, stationary member 20 is secured to retractor frame 12 along a path of slidable movement of actuator 22. Stationary member 20 includes a longitudinal, cylindrical shaft portion 20a extending through actuator aperture 22c, and a flange 33 extending outwardly from shaft portion 20a. Shaft portion 20a abuts the actuator seal where the shaft portion extends through aperture 22c. Shaft portion 20a and flange 33 are substantially cylindrical and substantially coaxial with spool 16. In the first embodiment, flange 33 is positioned within actuator cavity 40.

A plurality of apertures 35 are preferably formed in flange 33 such that a fluid communication is enabled between actuator interior cavity 40 and actuator pressure surface(s) 37. A passage 21 extends through shaft portion 20a to enable fluid communication between actuator cavity 40 and an igniter 17, described in further detail below. Upon activation of the pretensioner, actuator 22 slides along shaft portion 20a in a direction indicated by arrow A. Shaft portion 20a may be formed from steel, aluminum, metal alloys, plastic, and/or other known materials, using know processes, such as rollforming or extrusion. Flange 22 may also be made from the same materials as shaft portion 20a by known processes, such as stamping, cutting, piercing, or injection molding.

The present invention provides an actuator which converts a translational, or sliding, motion of the actuator into a rotary motion of a seatbelt retractor spool, for use in pretensioning the seatbelt. Conversion of the translational motion to rotational motion is effected by interposing a first plurality of engageable motion transmission elements between spool 16 and actuator 22, and by interposing a second engageable plurality of motion transmission elements between actuator 22 and stationary member 20.

Referring to FIG. 1, in the first embodiment, the engageable motion transmission elements comprise a series of helical splines 23 extending along an interior surface of spool sidewall 16a, and a complementary set of helical splines 25 extending along an exterior surface of actuator wall 22a. In addition, another series of helical splines 29 extend extending along an interior surface of actuator wall 22a, and a complementary set of helical splines 28 extend along a periphery of stationary member flange 33.

In the first embodiment, splines 23 along spool 16 and complementary splines 25 along actuator wall 22a are configured so that sliding engagement between splines 23 and 25 produces a rotation of splines 23 (and, thus, a corresponding rotation of spool 16) relative to splines 25. Similarly, splines 29 along actuator wall 22a and complementary splines 28 along flange 33 are configured so that sliding engagement between the splines 28 and 29 produces a rotation of splines 29 (and, thus, a corresponding rotation of actuator 20) relative to splines 28. Sliding engagement between the respective sets of splines is provided by movement of actuator 22 in the direction indicated by arrow A. As actuator 20 moves in the direction indicated by arrow "A", splines 29 along actuator wall 22a slidingly engage splines 28 along flange 33, thereby producing the desired relative rotational motion of actuator 22. Similarly, as actuator 20 moves along shaft portion 20a in the direction indicated by arrow "A", splines 25 along actuator wall 22a slidingly engage splines 23 along spool 16, thereby producing the desired relative rotational motion of spool 16. The principles used herein are similar to those used in the construction and operation of helical rotary actuator devices manufactured, for example, by Helac Corporation, Enumclaw, Wash.

In alternative embodiments, one or more of groups of helical splines 23, 25, 28, 29 described above may be replaced with other types of motion transmission elements designed for complementary interengagement. For example, the helical splines may be replaced with appropriately positioned helical gear teeth (not shown) adapted for operative engagement with the helical splines or other helical gear teeth. In addition, either a first plurality 23, 25 or a second plurality 28, 29 of motion transmission elements may comprise an interengageable series of straight (rather than helical) splines or straight gear teeth formed along the respective component surfaces of pretensioner 10. However, any system of complementary interengaging motion transmission elements used in the present invention should provide the desired rotational motion of spool 16 during sliding contact produced by motion of actuator 22. Thus, at least one plurality of a first plurality 23, 25 of motion transmission elements and a second plurality 28, 29 of motion transmission elements should have a helical configuration, which provides a relative rotation between the pretensioner components to which the motion transmission elements are attached, as previously described. For example, a first plurality 23, 25 of motion transmission elements may comprise a complementary engageable set of helical splines, while a second plurality 28, 29 of motion transmission elements comprises a complementary engageable set of straight splines, In another alternative embodiment (not shown), prior to activation of the pretensioner splines 29 inside actuator 22 are engaged with splines 28 spaced along flange 33, while splines 25 on the outside of actuator 22 are separated by a gap and are thus disengaged from splines 23 along spool wall 22a. In this embodiment, engagement between splines 23 and splines 25 is induced by translational motion of actuator 22 upon activation of the pretensioner.

In the first embodiment, motion of actuator 22 is produced by expanding gases resulting from combustion of a gas generant composition. Referring again to FIG. 1, an initiator assembly 14 is mounted to retractor frame 12 and comprises an igniter mount 17 and an igniter 15 secured within the igniter mount. A quantity of a gas generant composition (not shown) is positioned in actuator cavity 40, and is ignitable with igniter 15 when pretensioning of the associated seatbelt is desired. Gas generants useful in conjunction with the present invention are gas generants well known to those of ordinary skill in the art. For examples, see U.S. Pat. Nos. 5,035,757, 5,460,668, 5,756,929, and 5,872,329, each herein incorporated by reference. These compositions exemplify, but do not limit, useful gas generant compositions. In alternative embodiments, the gas generant composition may be positioned at other locations (for example, inside stationary member shaft portion 20a, or inside initiator assembly 14.)

Igniter 15 is coupled to pretensioner mechanism 10 so as to enable fluid communication between the igniter and the gas generant composition upon activation of the pretensioner. In the embodiment shown in FIG. 1, igniter 15 is positioned proximate an end of passage 21 formed in stationary member shaft portion 20a. Igniter 15 may be any suitable igniter, one example of which is disclosed in U.S. Pat. No. 6,009,809. Igniter 15 preferably contains (or is positioned proximate) a relatively small pyrotechnic charge or booster material (not shown), many of which are known in the art. Igniter 15 may be coupled to the pretensioner mechanism in any one of several alternative ways. For example, igniter 15 may be positioned at the opposite side of actuator 22 from the presently disclosed design, or the igniter may be positioned within actuator cavity 40 proximate the gas generant composition.

Figure 2:
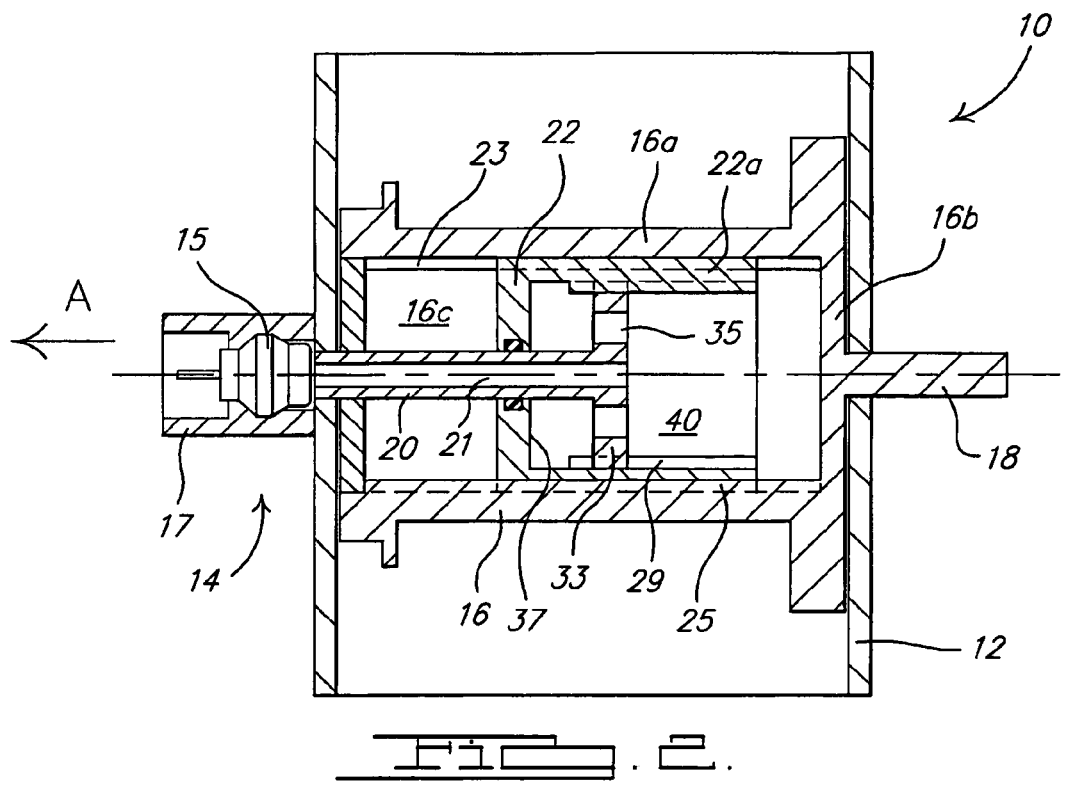
FIG. 2 is a cross-sectional side view of the pretensioner mechanism shown in FIG. 1 showing the pretensioner mechanism in a partially deployed state.
Figure 3:
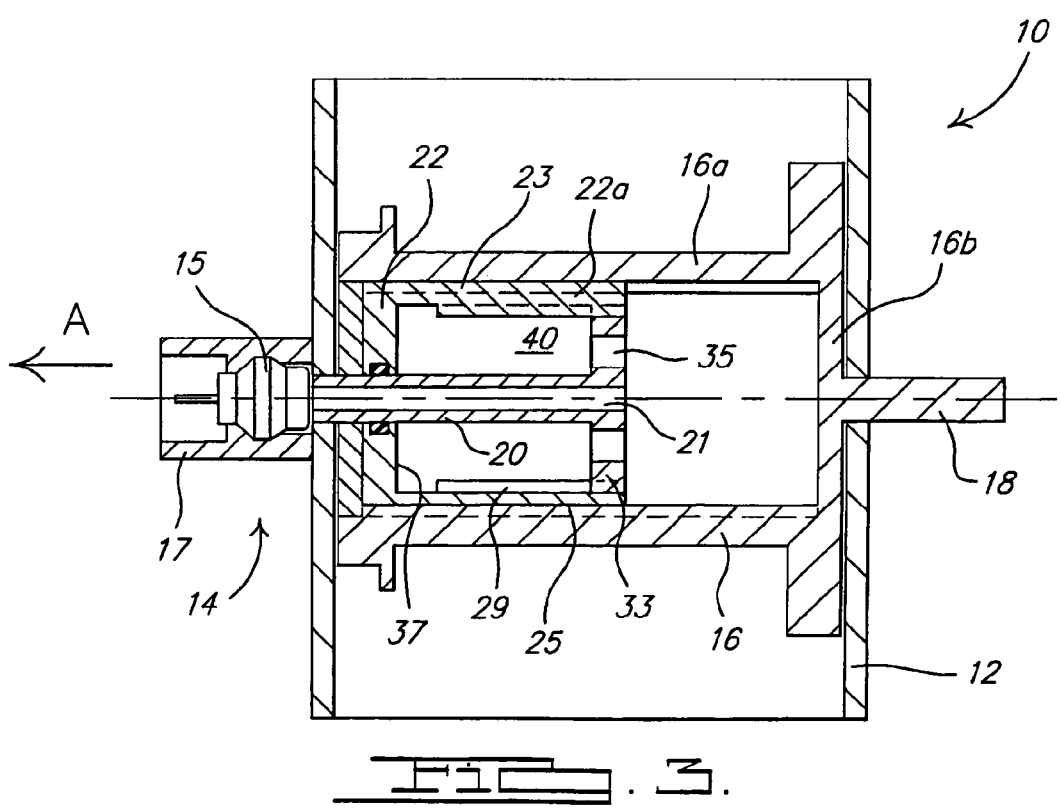
FIG. 3 is a cross-sectional side view of the pretensioner mechanism shown in FIG. 1 showing the pretensioner mechanism in a fully deployed state.

FIGS. 2 and 3 show actuator 22 in partially and fully deployed states, respectively. Referring to FIGS. 1-3, when pretensioner mechanism 10 is activated upon a crash event, a signal from a crash sensor (not shown) is conveyed to igniter 15, thereby activating the igniter and preferably igniting a booster charge positioned therein. A flame front resulting from activation of the booster charge traverses passage 21, and preferably ignites the gas generant material positioned in actuator cavity 40. Ignition of the gas generant preferably rapidly creates an expanding gas in actuator cavity 40. The pressure in cavity 40 thus increases relatively quickly, and expanding gases flow through flange apertures 35 to impinge upon pressure surface(s) 37 of actuator 22, providing an axial driving force on actuator 22. This drives actuator 22 in the direction indicated by arrow A.

As the axial force on actuator 22 drives actuator 22 across gap 27, splines 28 along actuator wall 22a slidingly engage splines 29 along flange 33, thereby producing the desired relative rotational motion of actuator 22. Simultaneously, splines 25 along actuator wall 22a slidingly engage splines 23 along spool 16, thereby producing the desired relative rotational motion of spool 16. Accordingly, the driving of actuator 22 axially within spool 16 will induce a rotation of spool 16, retracting the associated seatbelt. Stationary member 20 does not rotate during translational motion of actuator 22, but serves as an anchor, or base, against which a reaction force is exerted by the engaging sets of splines to support relative rotation of the other pretensioner elements.

The relative helical curvatures of splines 25, 23 and/or splines 28, 29 can be adjusted to provide for relatively more or less rotation of spool over a given time period, thus producing a more or less vigorous retraction of the seatbelt. In addition, the size of gap 27 separating splines 28 and 29 and/or the size of any gap separating splines 23 and 25 may be adjusted to control the distance traveled by actuator 22 prior to sliding engagement of the splines. This may be used to control the amount of relative rotation of spool 16. Further, the quantity and types of gas generant placed in chamber 40 can be adjusted to provide for greater or lesser force driving actuator 22, thereby affecting the speed with which the seatbelt is pretensioned.

After pretensioner 10 is activated, and actuator 22 driven along shaft portion 20a until the actuator rests against an inside end 42 of spool 16, wherein the actuator 22 is preferably locked against rotation by any of several means (for example, using residual internal pressure in cavity 40, friction among the various splines, or by a mechanical detent feature such as are known in the art.) After activation of the pretensioner, a force exerted on the seatbelt will be transmitted from spool 16 to stationary member 20 via the engaged splines. Shaft portion 20a may angularly deflect to absorb the applied force and will aid in controlling the maximum seatbelt force on the vehicle occupant as the webbing pays out.

A helical (or other non-straight) configuration of motion transmission elements is needed to provide relative rotation between the components of the pretensioner. Thus in the first embodiment, where both interengaging sets of splines have helical a configuration, the rotation of spool 16 can be maximized due to the relative rotations imparted by two sets of helical splines, rather than one set of helical splines.

Figure 4:
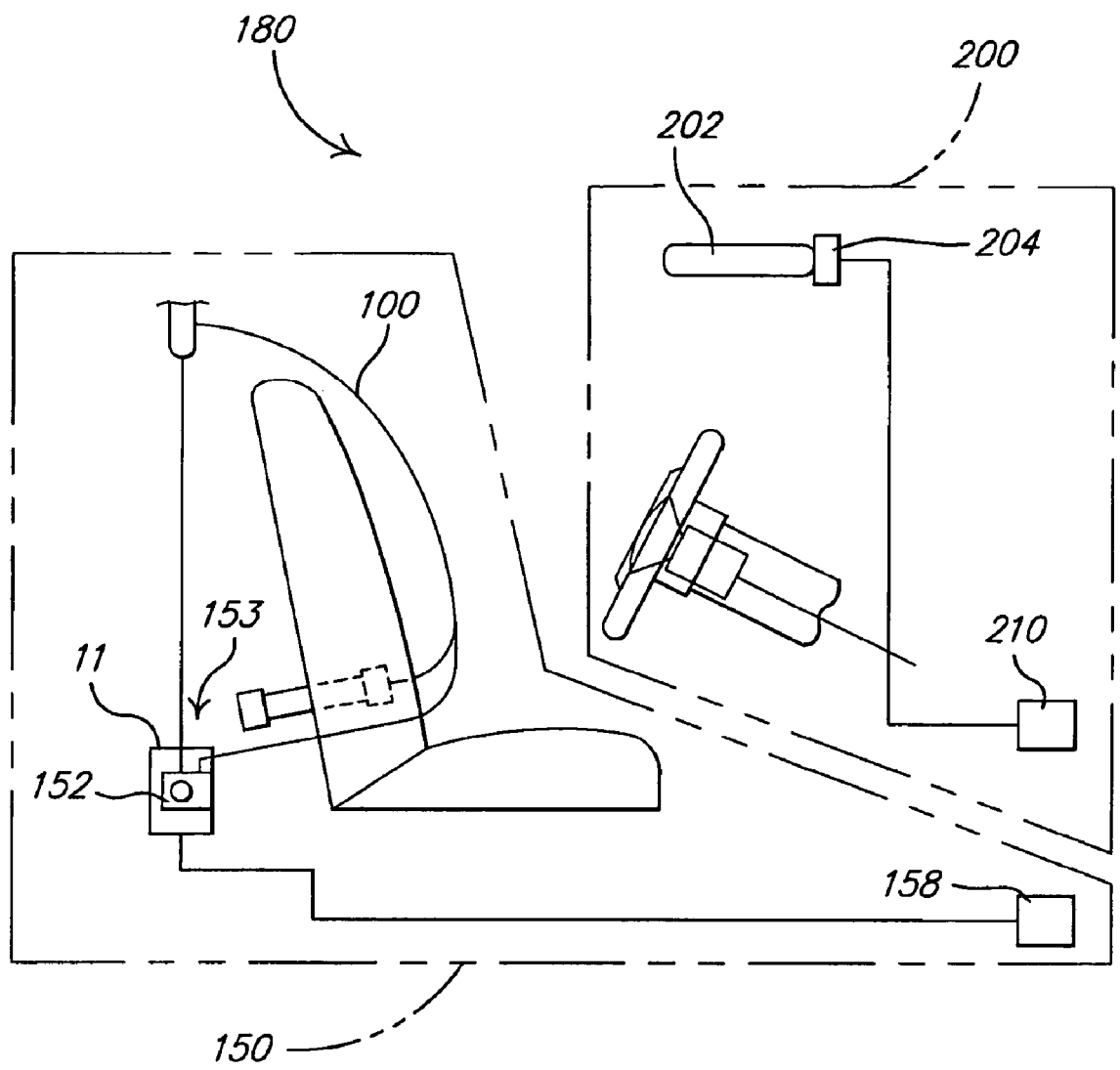
FIG. 4 is a schematic representation of an exemplary vehicle occupant restraint system incorporating a pretensioner mechanism in accordance with the present invention.

Any of the pretensioner embodiments described herein may also be incorporated into a safety belt assembly, as seen in FIG. 4. Safety belt assembly 150 includes a safety belt housing 152 and a safety belt 100 extending from housing 152. A safety belt retractor 11 (for example, a spring-loaded mechanism) may be coupled to an end portion 153 of the belt. In addition, a safety belt pretensioner mechanism (not shown) in accordance with the present invention may be coupled to belt retractor 11 to actuate the retractor mechanism in the event of a collision. Typical seat belt retractor mechanisms which may be used in conjunction with the pretensioner mechanism embodiments of the present invention are described in U.S. Pat. Nos. 5,743,480, 5,553,803, 5,667,161, and 4,597,546, incorporated herein by reference.

Safety belt system 150 may include (or be in operative communication with) a crash event sensor 158 (for example, an inertia sensor or an accelerometer) communicating with a known crash sensor algorithm that signals actuation of the belt pretensioner via, for example, activation of an associated igniter (not shown). U.S. Pat. Nos. 6,505,790 and 6,419,177, previously incorporated herein by reference, provide illustrative examples of pretensioners actuated in such a manner.

Referring again to FIG. 4, safety belt assembly 150 may also be incorporated into a broader, more comprehensive vehicle occupant restraint system 180 including additional elements such as an airbag system 200. FIG. 4 shows a schematic diagram of one exemplary embodiment of such a restraint system. Airbag system 200 includes at least one airbag 202 and an inflator 204 coupled to airbag 202 so as to enable fluid communication with an interior of the airbag. Inflator 204 contains a combustible gas generant composition (not shown) for generating inflation gas for inflating airbag 202, and at least one igniter (not shown) for igniting the gas generant composition in the inflator. Examples of inflators which may be incorporated into airbag system 200 are described in U.S. Pat. Nos. 6,752,421, 5,806,888, and 6,341,799, all incorporated herein by reference. Airbag system 200 may also include (or be in communication with) a crash event sensor 210 including a known crash sensor algorithm that signals actuation of airbag system 200 via, for example, activation of airbag inflator 204 in the event of a collision.

It is contemplated that the present invention will find primary application in side impact or head curtain airbag systems; however, it is not limited thereto. It will also be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. A pretensioner mechanism for use with a seatbelt retractor, the retractor having a rotatable member configured for winding a seatbelt webbing thereon, the pretensioner mechanism comprising:

a movable member slidably coupled to the rotatable member of the retractor;

a first plurality of engageable motion transmission elements, first ones of the first plurality of motion transmission elements extending along a portion of the rotatable member, second ones of the first plurality of motion transmission elements extending along a first portion of the movable member, the second ones of the first plurality of motion transmission elements being configured for operative engagement with the first ones of the first plurality of motion transmission elements;

a stationary member secured to a first side of the retractor along a path of slidable movement of the movable member; and a second plurality of engageable motion transmission elements, first ones of the second plurality of motion transmission elements extending along a second portion of the movable member, second ones of the second plurality of motion transmission elements extending along a portion of the stationary member, the second ones of the second plurality of motion transmission elements being configured for sliding engagement with the first ones of the second plurality of motion transmission elements, at least one plurality of the first plurality of motion transmission elements and the second plurality of motion transmission elements having a helical configuration for producing relative rotation between first ones and second ones of the at least one plurality of motion transmission elements upon sliding engagement therebetween, wherein activation of the pretensioner mechanism produces a sliding movement of the movable member toward the first die of the retractor, thereby producing simultaneous sliding engagement between the first ones and the second ones of the first plurality of motion transmission elements and sliding engagement between the first ones and the second ones of the second plurality of motion transmission elements, and wherein simultaneous sliding engagement of the first plurality of motion transmission elements and sliding engagement of the second plurality of motion transmission elements produce a rotation of the rotatable member with respect to the stationary member, thereby pretensioning a seatbelt webbing wound on the rotatable member.

2. The pretensioner mechanism of claim 1 wherein the first plurality of motion transmission elements are engaged prior to activation of the pretensioner, and wherein rotation of the rotatable member prior to activation of the pretensioner produces a rotation of the movable member in conjunction with the rotatable member.

3. The pretensioner mechanism of claim 1 wherein the second ones of the second plurality of motion transmission elements are spaced apart from the first ones of the second plurality of motion transmission elements prior to activation of the pretensioner.

4. The pretensioner mechanism of claim 1 wherein the first plurality of motion transmission elements have a helical configuration.

5. The pretensioner mechanism of claim 1 wherein the second plurality of motion transmission elements have a helical configuration.

6. The pretensioner mechanism of claim 1 wherein both the first plurality of motion transmission elements and the second plurality of motion transmission elements have a helical configuration.

7. The pretensioner mechanism of claim 1 wherein the rotatable member includes a wall defining an interior cavity, the first ones of the first plurality of motion transmission elements extend along the wall inside the cavity, and the portion of the movable member along which the second ones of the first plurality of motion transmission elements extend is received inside the cavity, whereby the first and second ones of the first plurality of motion transmission elements are operatively engageable.

8. The pretensioner mechanism of claim 1 wherein the second ones of the first plurality of motion transmission elements are spaced apart from the first ones of the first plurality of motion transmission elements prior to activation of the pretensioner.

9. The pretensioner mechanism of claim 4 wherein the first plurality of motion transmission elements comprise helical splines.

10. The pretensioner mechanism of claim 5 wherein the second plurality of motion transmission elements comprise helical splines.

11. The pretensioner mechanism of claim 6 wherein both the first plurality of motion transmission elements and the second plurality of motion transmission elements comprise helical splines.

12. A pretensioner mechanism for use with a seatbelt retractor, the retractor having a rotatable member conilaured for windina a seatbelt webbing thereon, the pretensioner mechanism comprising:

a movable member slidably coupled to the rotatable member of the retractor;

a first plurality of engageable motion transmission elements first ones of the first plurality of motion transmission elements extending along a portion of the rotatable member second ones of the first plurality of motion transmission elements extending along a first portion of the movable member the second ones of the first plurality of motion transmission elements being configured for operative engagement with the first ones of the first plurality of motion tranmission elements;

a station member secured to the retractor along a path of slidable movement of the movable member; and a second plurality of engagable motion transmission elements, first ones the second plurality of motion transmission elements extending along a second portion of the movable member, second ones of the second plurality of motion transmission elements extending along a portion of the stationary member, the second ones of the second plurality of motion transmission elements being configured for sliding engagement with the first ones of the second plurality of motion transmission elements;

at least one plurality of the first plurality of motion transmission elements and the second plurality of motion transmission elements having a helical configuration for producing relative rotation between first ones and second ones of the at least one plurality of motion transmission elements unon sliding enganement therebetween, wherein activation of the pretensioner produces a sliding movement of the movable member, thereby producing simultaneous sliding engagement between the first ones and the second ones of the first plurality of motion transmission elements and sliding engagement between the first ones and the second ones of the second plurality of motion transmission elements, wherein simultaneous sliding engagement of the first plurality of motion transmission elements and sliding engagement of the second plurality of motion transmission elements produce a rotation of the rotatable member with respect to the stationary member, thereby pretensioning a seatbelt webbing wound on the rotatable member, and wherein the movable member includes a wall defining an interior cavity, the first ones of the second set of motion transmission elements extend along the wall inside the cavity, and the portion of the stationary member along which the second ones of the second set of motion transmission elements extend is received inside the movable member cavity, whereby the first and second ones of the second plurality of motion transmission elements are operatively engageable;

at least one aperture formed in the portion of the stationary member received in the movable member cavity to enable fluid communication between a first side of the portion and a second side of the portion;

a quanatity of a gas generant composition positioned in the movable rncmber interior cavity on the first side of the portion; and an igniter coupled to the pretension of so as to enable fluid communication between the igniter and the gas generant composition upon activation of the pretensioner, the movable member further including a pressure surface positioned to the second side of the portion, wherein, upon activation of the pretensioner, ignition of the igniter produces ignition of the gas generant composition thereby producing expanding gases which flow throuch the at least one aperture from the first side of producing a sliding movement of the movable member, wherein the movable member further includes an aperture formed therein to enable communication between the movable member cavity and an exierior of the movable member, another portion of the stationary member extends from the portion of the stationary member along which the second ones of the second plurality of motion transmission elements extening through the movable member aperture; and the portion of the stationary member extending through the aperture includes a passage formed therein to enable fluid communication between the igniter and the first side of the portion of the stationary member received in the cavity upon activation of the pretensioner.

13. The pretensioner mechanism of claim 12 wherein the igniter is mounted on a portion of the retractor.

14. A pretensioner mechanism for use with a seatbelt retractor, the retractor having a rotatable member configured for winding a seatbelt webbing thereon, the pretensioner mechanism comprising:

a movable member slidably coupled to the rotatable member of the retractor;

a first plurality of engageable motion transmission elements, first ones of the first plurality of motion transmission elements extending along a portion of the rotatable member, second ones of the first plurality of motion transmission elements extending along a first portion of the movable member, the second ones of the first plurality of motion transmission elements being configured for operative engagement with the first ones of the first plurality of motion transmission elements;

a stationary member secured to the retractor along a path of slidable movement of the movable member; and a second plurality of engageable motion transmission elements, first ones of the second plurality of motion transmission elements extending along a second portion of the movable member, second ones of the second plurality of motion transmission elements extending along a portion of the stationary member, the second ones of the second plurality of motion transmission elements being configured for sliding engagement with the first ones of the second plurality of motion transmission elements, at least one plurality the first plurality of motion transmission elements and the second plurality of motion transmission elements having a helical configuration for producing relative rotation between first ones and second ones of the at least one motion transmission elements upon sliding engagment therebetween, wherein activation of the pretensioner produces a sliding movement of the movable member, thereby producing simultaneous sliding engagement between the first ones and the second ones of the first plurality of motion transmission elements and sliding engagement between the first ones and the second ones of the second plurality of motion transmission elements, and wherein simultaneous sliding engagement of the first plurality of motion transmission elements and sliding engagement of the second plurality of motion transmission elements produce a rotation of the rotatable member with respect to the stationary member, thereby pretensioning a seatbelt webbing wound on the rotatable member, wherein the movable member includes a wall defining an interior cavity, and the first ones of the second set of motion transmission elements extend along the wall inside the cavity, and the portion of the stationary member along which the second ones of the second set of motion transmission elements extend is received inside the movable member cavity, whereby the first and second ones of the second plurality of motion transmission elements are operatively engageable;

at least one aperture formed in the portion of the stationary member received in the movable member cavity to enable fluid communication between a first side of the portion and a second side of the portion;

a quantity of a gas generant composition positioned in the movable member interior cavity on the first side of the portion; and an igniter coupled to the pretensioner so as to enable fluid communication between the igniter and the gas generant composition upon activation of the pretensioner, and the movable member further including a pressure surface positioned to the second side of the portion wherein, upon activation of the pretensioner, ignition of the igniter produces ignition of the gas generant composition, thereby producing expanding gases which flow through the at least one aperture from the first side of the portion to the second side of the portion to impinge upon the movable member pressure surface, thereby producing a sliding movement of the movable member.

15. A seatbelt assembly comprising:

a seatbelt;

a belt retractor coupled to an end portion of the seatbelt, the retractor having a rotatable member configured for winding the seatbelt thereon; and a pretensioner mechanism coupled to the belt retractor to tension the seatbelt in the event of a collision, the pretensioner mechanism including a movable member slidably coupled to the rotatable member of the retractor;

a stationary member secured to a first side of the retractor along a path of slidable movement of the movable member; and a first plurality of interengageable motion transmission elements and a second plurality of interengageable motion transmission elements separate from the first plurality, at least one motion transmission element of the first plurality of motion transmission elements and the seond plurality of motion transmission elements having a helical configuration, wherein activation of the pretensioner mechanism produces a sliding movement of the movable member toward the first side of the retractor, thereby producing simultaneous sliding engagement between elements of the first plurality of motion transmission elements and sliding engagement between elements of the second plurality of motion transmission elements.

16. The seatbelt assembly of claim 15 wherein the pretensioner mechanism further comprises:
a movable member slidably coupled to the rotatable member;
a stationary member secured to the retractor along an axis of slidable movement of the movable member, wherein the first plurality of motion transmission elements operatively couples the movable member and the rotatable member, and the second plurality of motion transmission elements operatively couples the movable member and the stationary member;
at least one plurality of the first plurality of motion transmission elements and the second plurality of motion transmission elements having a helical configuration for producing relative rotation between first ones and second ones of the at least one plurality of motion transmission elements upon sliding engagement therebetween,
wherein activation of the pretensioner produces a sliding movement of the movable member, thereby producing simultaneous sliding engagement of the first plurality of motion transmission elements and sliding engagement of the second plurality of motion transmission elements,
and wherein simultaneous sliding engagement of the first plurality of motion transmission elements and sliding engagement of the second plurality of motion transmission elements produce a rotation of the rotatable member with respect to the stationary member, thereby pretensioning a seatbelt wound on the rotatable member.

17. The seatbelt assembly of claim 16 further comprising:
a pressure surface formed on the movable member;
a quantity of a gas generant composition positioned so as to be in fluid communication with the pressure surface upon ignition of the gas generant composition; and
an igniter coupled to the pretensioner so as to enable fluid communication between the igniter and the gas generant composition upon activation of the pretensioner,
wherein, upon activation of the pretensioner, ignition of the igniter produces ignition of the gas generant composition, thereby producing expanding gases which impinge upon the movable member pressure surface, thereby producing a sliding movement of the movable member.

18. A vehicle occupant restraint system comprising:
a safety belt system assembly including a seatbelt, a belt retractor coupled to an end portion of the seatbelt, the retractor having a rotatable member configured for winding the seatbelt thereon; and
a pretensioner mechanism coupled to the belt retractor to tension the seatbelt in the event of a collision, the pretensioner mechanism including
a movable member slidably coupled to the rotatable member of the retractor;
a stationary member secured to a first side of the retractor alone a path of slidable movement of the movable member; and
a first plurality of interengageable motion transmission elements and a second plurality of interengageable motion transmission elements separate from the first plurality, at least one motion transmission element of the first plurality of motion transmission elements and the second plurality of motion transmission elements having a helical configuration,
wherein activation of the pretensioner mechanism produces a sliding movement of the movable member toward the first side of the retractor, thereby producing simultaneous sliding engagement between elements of the first plurality of motion transmission elements and sliding engagement between elements of the second plurality of motion transmission elements.

19. The vehicle occupant restraint system of claim 18 wherein the pretensioner mechanism comprises:
a movable member slidably coupled to the rotatable member; and
a stationary member secured to the retractor along an axis of slidable movement of the movable member;
wherein the first plurality of motion transmission elements operatively couples the movable member and the rotatable member, and the second plurality of motion transmission elements operatively couples the movable member and the stationary member;
at least one plurality of the first plurality of motion transmission elements and the second plurality of motion transmission elements having a helical configuration for producing relative rotation between first ones and second ones of the at least one plurality of motion transmission elements upon sliding engagement therebetween,
wherein activation of the pretensioner produces a sliding movement of the movable member thereby producing simultaneous sliding engagement of the first plurality of motion transmission elements and sliding engagement of the second plurality of motion transmission elements,
and wherein simultaneous sliding engagement of the first plurality of motion transmission elements and sliding engagement of the second plurality of motion transmission elements produce a rotation of the rotatable member with respect to the stationary member, thereby pretensioning a seatbelt wound on the rotatable member.

20. The vehicle occupant restraint system of claim 19 further comprising:
a pressure surface formed on the movable member;
a quantity of a gas generant composition positioned so as to be in fluid communication with the pressure surface upon ignition of the gas generant composition; and
an igniter coupled to the pretensioner so as to enable fluid communication between the igniter and the gas generant composition upon activation of the pretensioner,
wherein, upon activation of the pretensioner, ignition of the igniter produces ignition of the gas generant composition, thereby producing expanding gases which impinge upon the movable member pressure surface, thereby producing a sliding movement of the movable member.

* * * * *

UNITED STATES PATENT AND TRADEMARK OFFICE
CERTIFICATE OF CORRECTION

PATENT NO. : 7,424,985 B2
APPLICATION NO. : 11/039526
DATED : September 16, 2008
INVENTOR(S) : Stevens et al.

It is certified that error appears in the above-identified patent and that said Letters Patent is hereby corrected as shown below:

Column 4; Line 32; delete "," and insert --.--

Column 7; Line 21; delete "die" and insert --side--

Column 8; Claim 12; Line 15; delete "conilaured" and insert --configured--

Column 8; Claim 12; Line 16; delete "windina" and insert --winding--

Column 8; Claim 12; Line 29; delete "station" and insert --stationary--

Column 9; Claim 12; Line 11; delete "pretension of" and insert --pretensioner--

Column 9; Claim 12; Line 19; delete "throuch" and insert --through--

Column 9; Claim 12; Line 19; after of please insert --the portion to the second side of the portion to impinge upon the moveable member pressure surface, thereby--

Column 9; Claim 12; Line 23; delete "exierior" and insert --exterior--

Column 9; Claim 12; Line 28; delete "extening" and insert --extend--

Column 9; Claim 14; Line 63; insert --of-- between plurality the

Column 10; Claim 14; Line 1; insert --plurality of-- between one motion

Column 11; Claim 16; Line 8; insert --and-- after ber;

UNITED STATES PATENT AND TRADEMARK OFFICE
CERTIFICATE OF CORRECTION

PATENT NO. : 7,424,985 B2
APPLICATION NO. : 11/039526
DATED : September 16, 2008
INVENTOR(S) : Stevens et al.

It is certified that error appears in the above-identified patent and that said Letters Patent is hereby corrected as shown below:

Column 11; Claim 18; Line 57; delete "alone" and insert --along--

Signed and Sealed this

Thirtieth Day of December, 2008

JON W. DUDAS
*Director of the United States Patent and Trademark Office*